Feb. 23, 1937. G. V. ÖHOLM 2,071,895
METHOD OF AND APPARATUS FOR CLEANING PINE AND FUR CONES AND THE LIKE
Filed July 3, 1934 2 Sheets-Sheet 1

G. V. Öholm
INVENTOR

By: Marks & Clerk
Attys.

Patented Feb. 23, 1937

2,071,895

UNITED STATES PATENT OFFICE 2,071,895

METHOD OF AND APPARATUS FOR CLEANING PINE AND FIR CONES AND THE LIKE

Gustav Valdemar Öholm, Nockeby, Sweden, assignor to Aktiebolaget Svenska Flaktfabriken, Stockholm, Sweden Application July 3, 1934, Serial No. 733,680

7 Claims. (Cl. 209—2)

The present invention relates to a method of and apparatus for so-called cleaning of pine- and fir-cones and the like, by which the seed is separated from the cones proper.

Previously the said cleaning process has generally been carried out by subjecting the cones while lying still to artificial drying. The cones having been opened and the seeds having got loose, it is possible by a special operation independent of the drying process to separate the seeds from the cones for further treatment. This method, however, entails the drawback that the drying cannot be forced, the seeds proper not enduring heating to a high temperature without being damaged, and a special operation is required for separating the cleaned cones.

According to the present invention the cleaning of the cones is effected by simultaneously subjecting the cones to artificial drying by means of hot air passing through the cones and to stirring, thereby separating the seeds from the cones and removing them from the drying process successively as they get loose from the cones. In this manner overheating of the seeds separated from the cones is avoided, and it is possible to use a considerably higher temperature of the drying air which in its turn involves a considerably improved heat economy by reason of a smaller quantity of air being required for removing the evaporated water. By the present invention the time of cleaning may be essentially shortened, which is an advantage from several points of view. Also various kinds of cones thereby may be more easily treated separately, avoiding the risk of mixing different kinds of seeds together. This will be of importance for seed cleaning plants, which are to serve for woodlands having different soils and being located at very different heights above the sea. Furthermore the cleaning operation is simplified to a very considerable extent by the time-wasting manual labor being reduced to a minimum and being practically done away with at continuous operation.

According to my present invention the cleaning preferably is carried out in a substantially horizontal, rotating drum, the shell of which is provided with such perforations as to let the seeds through but not the cones. The supplying of the cones into the drum takes place discontinuously or continuously, and I keep a large charge depth in the drum so as to obtain good mixing and a greater effect of the drying air, which is forced through it. The drying medium is forced through the perforation of the shell right through the charge, and the cones, from which the seeds have been separated successively, are removed from the drum by hand or automatically.

To obtain the highest possible heat economy I arrange the apparatus in such a way that the drying air circulates through the charge of the drum and a heating device, in which the air is re-heated, new fresh air being supplied beyond the heating device according as it is required, the corresponding cooled and moist quantity of air leaving the circulation process thus taking away the evaporated moisture.

The invention is illustrated diagrammatically by the accompanying drawings showing two embodiments of an apparatus for carrying out the process.

Figure 3:
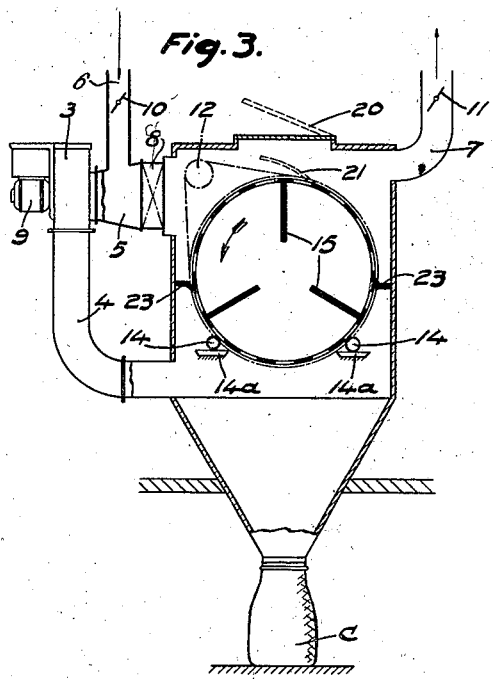
Figure 3 shows a section III—III of Figure 4, the latter figure being a side view of one embodiment.
Figure 4:
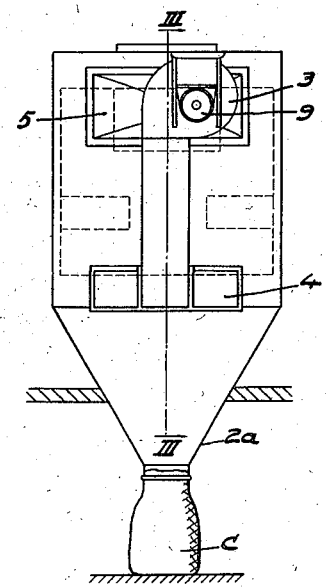

The embodiment according to Figures 3 and 4 is meant for discontinuous operation and the other embodiment for continuous operation. The differences in construction of the two embodiments are mainly due to the said different ways in which they are operated. Both embodiments have the following parts in common: the drum 1, the casing 2 of the apparatus, in which casing the drum is rotatably disposed, an air circulation device exemplified by a fan 3, and circulation pipes 4, 5; furthermore an inlet 6 for fresh air and an outlet 7 for moist air, a heating device for the air, below called a heating battery and indicated by 8, and a funnel-shaped container 2a connected to the bottom of the casing. Among other parts 9 indicates the fan motor, 10 and 11 indicate control dampers for the inlet and outlet pipes, respectively, 12 a sprocket wheel and 13 an appertaining chain for transmitting the movement to the drum from a driving shaft 13a, shown in Fig. 6 which by means of a screw wheel 13b or some other transmission may be geared from a driving motor, not shown. 14 indicates supporting rolls for the drum and 14a indicates the bearings of said supporting rolls. The drum 2 supported on the rolls 14 is rotated by the belt 13 and closure members 23 prevent air from passing upwardly in the casing except through the drum. 15 indicates stirring members or drivers disposed on the inside of the drum shell, and 24 is a door in the side wall of the casing 2, see Fig. 1.

In both of the embodiments the drying air is forced by the fan in the following direction: the fan—the pipe 4—the drum—the heating battery—the fan. During this circulation moist air leaves through the pipe 7 and a corresponding quantity of fresh air enters through the pipe 6.

Figure 1:
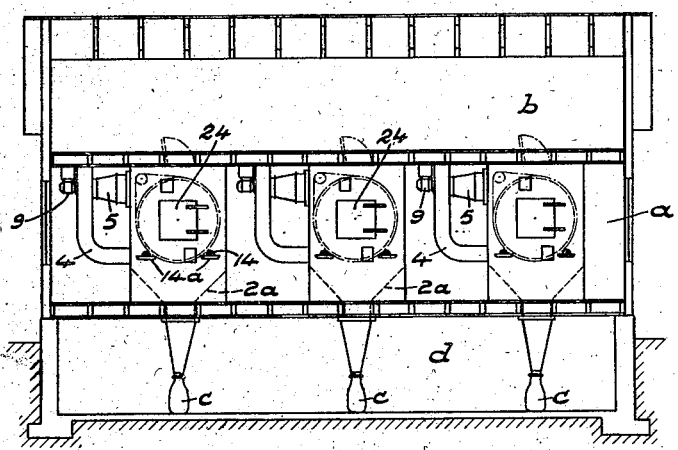
Figures 1 and 2 show respectively a vertical longitudinal section and a vertical cross section of a plant, including a number of apparatus according to the invention.
Figure 2:
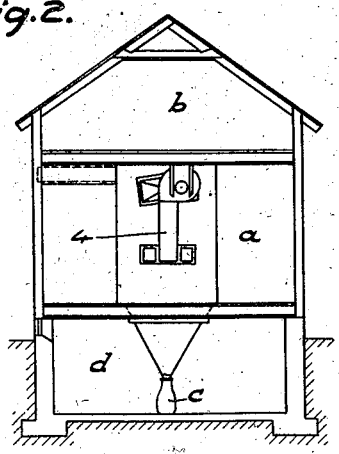

In large apparatus a plurality of fans, circulation pipes and heating batteries may be used. Both of the embodiments may be mounted in buildings and, according to local circumstances, be arranged either for taking out the seeds in the basement-story or in the same story as that in which the apparatus is mounted. Figures 1 and 2 show the first alternative form of mounting with a number of apparatus, in this case three apparatus, constructed as shown in Figures 3 and 4. The apparatus are placed in the first story a, the supplying of the cones takes place in the next story b, in the drawings forming the attic of the building, and the seeds are collected in bags c down in the basement-story d, where the outlet opening of the container 2a is located.

A special advantage of the apparatus according to the present invention is, however, that it is not necessarily stationarily mounted, as shown in the drawings, but may just as well be portable for temporary mounting at the place where the cones are collected so as to avoid long transportation of the same.

The apparatus according to Figures 3 and 4 is served and operates in the following manner: Prior to the cleaning the non-cleaned cones are thrown into the drum through a shutter 20 in the casing of the apparatus and a shutter 21 in the shell of the drum. After the two shutters have been closed, the fan and the drum are put in motion and heat is turned on to the battery 8 from a source of heat. The drum is then rotated slowly during the whole cleaning operation, by which the cones will be kept in continuous movement during the said operation and stirred by the action of the members 15. As regards the said members experience teaches that they must have a certain minimum width in radial direction so as to be sufficiently effective. The said minimum width must correspond to at least half the depth of the layer of cones. When the seeds get loose from the cones they fall through the perforated shell of the drum down into the container. The container is emptied afterwards prior to the removal of the cleaned cones, which are not taken out of the apparatus until the cleaning has been completely finished, and takes place by opening a door at the bottom of the container, so that the cones fall out. Then the procedure is repeated. By means of the apparatus shown in Figures 3 and 4 it is possible to carry out 3 to 4 cleaning operations within 24 hours, according to the moisture content of the cones and other influencing factors.

Figure 5:
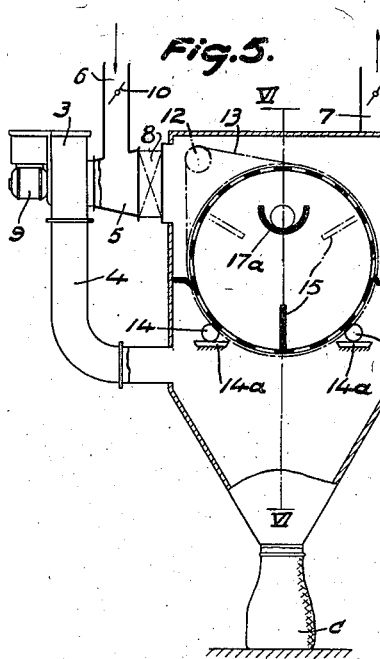
Figure 5 shows a section V—V of Figure 6 and the last mentioned figure a section VI—VI of Figure 5 of the other embodiment.
Figure 6:
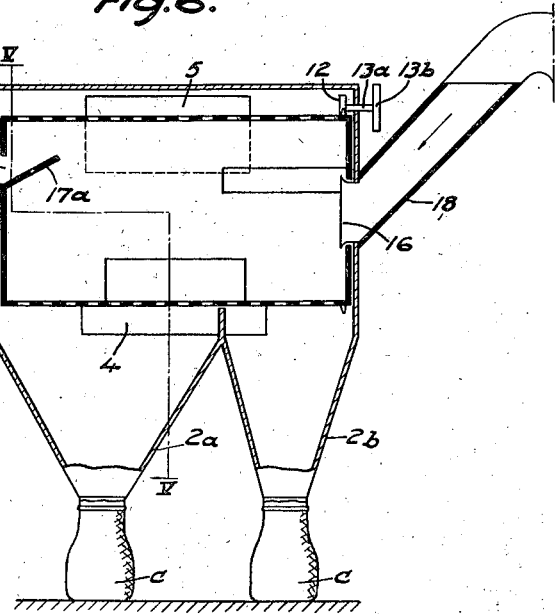

In the apparatus according to Figures 5 and 6, which is intended for continuous operation, the cones are supplied to the drum through a central opening 16 provided in the right end of the drum and leave the drum through an outlet 17. The supply pipe 18 may either lead from the overlying story or from some other place, in which latter case, according to the level of the place, an elevator or some other conveyer may be used for supplying the cones. Fundamentally the mode of operation of the apparatus is the same as that of the apparatus according to Figures 3 and 4 but differs in the ways of supplying and removing the cones, both of which take place completely automatically, the cones fall down into the drum at the right end and during the slow rotation of the drum they move towards the opposite end, where a stationary scoop 17a located at the left end right in front of the opening 17, at each turn lifts a number of cones to the outlet pipe 17b, through which they then fall down. For collecting needles and similar impurities a separate container 2b, see Figure 6, may be used. The said impurities fall out immediately and prior to the seeds and therefore they may be collected at the end of the drum, where the cones fall down into the drum. Prior to the seeds beginning to fall out the cones have time to move so far towards the opposite end of the drum that they come above the container 2a.

As a heating source for the heating battery 8 a stove or boiler may be used, mounted as an integrant part of the plant. The said heating device may be constructed with a magazine for the fuel such as wood, coke, or cones in order to require very little attendance.

Having now described my invention, what I claim as new and desire to secure by Letters Patent is:

1. A method for extracting seed from pine and fir cones and the like, consisting in simultaneously subjecting the cones in a charge to a hot gaseous fluid and turning them and causing them to fall promiscuously in the charge by revolving the charge and in removing the seed from the hot fluid successively as the seed is released from the cones.

2. A method for extracting seed from pine and fir cones and the like, consisting in simultaneously subjecting the cones in a charge to a hot gaseous fluid and turning them and causing them to fall promiscuously in the charge by revolving the charge and in removing the seed from the hot fluid successively as the seed is released from the cones, the gaseous fluid such as air being circulated between and through the charge of cones and a heat supplying device, cooled and moist air being led away from the circulation process and a corresponding quantity of fresh air being supplied to the process.

3. A method of cleaning pine and fir cones and the like, consisting in simultaneously stirring cones in a charge by revolving said charge and subjecting the cones to drying by means of a hot gaseous fluid, and in successively removing from the drying operation the separated seeds as they are separated from the cones, the gaseous fluid such as air being circulated between and through the charge of cones and a heat supplying device, cooled and moist air being led away from the circulation process and a corresponding quantity of fresh air being supplied to the process.

4. Apparatus for extracting seed from pine and fir-cones and the like, comprising a stationary casing, a substantially horizontal, single drum for receiving the cones during the drying process, rotatably disposed within said casing, the said drum having its shell provided with such perforations as to let the seed through, but not the cones, said casing having an inlet for the fresh fluid and an outlet for the moist fluid both arranged to let the fluid pass into and out of the drum through the shell of the drum and being provided with means to recirculate the fluid through the drum and through the charge, one of the end plates of the drum having an inlet for the cones corresponding with an opening in the casing, the other plate having an outlet for the cones corresponding with another opening in the casing, both the last-mentioned openings being located above the center of the drum.

5. Apparatus for extracting seed from pine and fir-cones and the like, comprising a stationary casing, a substantially horizontal, single drum for receiving the cones during the drying process, rotatably disposed within said casing, the said drum having its shell provided with such perforations as to let the seed through, but not the cones, means continuously circulating and recirculating a body of air through the drum, means for heating said air, means for admitting fresh air to said body of air, and means for withdrawing moist air therefrom, said apparatus being provided with a container below the drum, the said container being integral with the casing, one of the end plates of the drum having an inlet for cones corresponding with an opening in the casing, the other end plate having an outlet for the cones corresponding with another opening in the casing, this opening being located above the center of the drum, the interior of the drum being provided with a scoop member rotating with the drum and adapted to feed some cones through the last mentioned opening out of the drum during each turn of the same.

6. Apparatus for extracting seed from pine and fir cones and the like, comprising a stationary casing, a substantially horizontal, single drum for receiving the cones during the drying process, rotatably disposed within said casing, the said drum having its shell provided with such perforations as to let the seed through, but not the cones, said casing having an inlet for the fresh fluid and an outlet for the moist fluid both arranged to let the fluid pass into and out of the drum through the shell of the drum and being provided with means to circulate the fluid through the drum and through the charge, said apparatus being provided with containers below the drum, one open to the forward end of the drum and the other open to the rear portion of the drum, the said containers being rigidly connected to the casing, said casing being provided with tightening members disposed between the walls in the casing and the drum.

7. Apparatus as claimed in claim 4, provided with a separate container below the drum for needles and the like.

GUSTAV VALDEMAR ÖHOLM.